United States Patent
Ehn, Jr.

[11] Patent Number: 5,309,699
[45] Date of Patent: May 10, 1994

[54] APPARATUS AND METHOD FOR ELEVATIONAL CONTROL OF A TRACTOR-SUPPORTED LAWN MOWER

[75] Inventor: Byron N. Ehn, Jr., Menomonee Falls, Wis.

[73] Assignee: Textron Inc., Providence, R.I.

[21] Appl. No.: 922,239

[22] Filed: Jul. 31, 1992

[51] Int. Cl.⁵ ............................................ A01D 47/00
[52] U.S. Cl. .................................. 56/10.2; 56/7; 56/DIG. 15
[58] Field of Search ................. 56/6, 7, 10.2, 10.4, 56/11.9, 13.6, DIG. 10, DIG. 15

[56] References Cited
U.S. PATENT DOCUMENTS

| | | |
|---|---|---|
| 3,177,638 | 4/1965 | Johnson . |
| 3,511,035 | 5/1970 | Strasel . |
| 3,808,778 | 5/1974 | Hoffmeyer et al. . |
| 3,918,240 | 11/1975 | Haffner et al. ........................ 56/7 |
| 3,992,858 | 11/1976 | Hubbard et al. . |
| 4,873,817 | 10/1989 | Harms .......................... 56/10.2 R |
| 4,878,338 | 11/1989 | Aldred et al. . |
| 5,237,802 | 8/1993 | Fachini et al. ................... 56/10.2 |

Primary Examiner—Timothy V. Eley
Attorney, Agent, or Firm—Arthur J. Hansmann

[57] ABSTRACT

A tractor-supported lawn mower which has raising and lowering controls for automatically raising the mowers to a predetermined elevation and for automatically lowering the mowers to the ground, both raising and lowering functions being effective in response to minimal operator manual control.

22 Claims, 3 Drawing Sheets

APPARATUS AND METHOD FOR ELEVATIONAL CONTROL OF A TRACTOR-SUPPORTED LAWN MOWER

This invention relates to apparatus and method for elevational control of a tractor-supported lawn mower, and, more particularly, it relates to the lifting and lowering of a mower which is supported on a tractor, and to do so in a controlled manner so that the mower can be raised to an intermediate elevated position between the ground level for mowing and the raised position for transport, and the mower can be retained in that intermediate position while the tractor is being maneuvered.

BACKGROUND OF THE INVENTION

This invention provides for a mower elevational control system wherein the mowers can be raised to an intermediate elevation above the ground and thereby permit the tractor to be steered or turned around, but without mowing while turning. For instance, in the mowing of a golf course fairway, when the fairway is being mowed crosswise, the mowers are to be lifted when the machine meets the side edge of the fairway, so that the adjacent rough grounds will not be mowed. That is, the mowers are lifted along the sidelines of the fairway, and they are held in the lifted or predetermined elevated position until the tractor is turned 180 degrees and again approaches the fairway whereupon the mowers are lowered at that previously identified line and the fairway is then mowed in the opposite crosswise direction. In all instances, the rough is not mowed, and the operator need not attend to the function of maintaining the mowers raised while also operating the tractor, because the mowers are automatically retained in the raised position by the system of this invention, and the raised position and the subsequent lowered position are automatically achieved elevation-wise.

This invention provides a system whereby the mowers can be raised and lowered under controlled conditions. The prior art is aware of raising and lowering mowers, such as by hydraulic systems which this invention utilizes, but in the prior art, the operator was required to hold the hydraulic lift valve in the raised position until he could determine that the mowers were sufficiently raised to clear the grass which was not to be mowed, such as the aforementioned rough. Subsequently, in the prior art, the operator then had to hold or maneuver the hydraulic valve to the lowering position until the system completely lowered the mowers back to the ground. This is an operator-dependent system which is fatigueing and imprecise with regard to the amount of elevation, for instance. The prior art is also aware of a hydraulic system for raising mowers and wherein the control lever maneuvered by the operator can be actuated to raise the mowers and then the operator can release the lever and the mowers will remain raised until the operator again activates the lever for lowering the mowers. However, that type of system did not provide for the predetermined intermediate elevation between ground level and transport elevation of the mower, nor did it provide for the selective raising and lowering of certain ones of the mowers to a predetermined elevation, such as in this invention. Examples of the prior art utilizing hydraulic systems for raising and lowering mowers are shown in U.S. Pat. Nos. 3,511,035 and 3,808,778 and 3,992,858 and 4,878,338, and 3,177,638.

The present invention differs from the prior art in that it provides for a mower raising and lowering system wherein the mowers can be automatically positioned to a predetermined level, without requiring the continuous attention of the operator, and the mowers can then be retained in that predetermined elevation, again, without requiring the attention of the operator, and subsequently the mowers can be lowered to the ground, again, without the continuous attention of the operator.

Still further, the present invention provides for a mower-lifting and lowering system wherein certain of the mowers, such as the wing mowers can be raised independent of the other mowers of a gang of mowers supported on a tractor, and the wing mowers can be raised to a transport position independent of raising the other mowers of the gang, all while accomplishing the aforementioned objective of alternately being able to raise all of the mowers to the predetermined elevation for the fairway mowing example described.

In accomplishing the aforementioned objectives, the present system requires only that the operator initiate the raising or lowering action and then the system described herein controls the raising and lowering action to the desired predetermined elevation and back down to the ground, all without requiring the operator's further attention after the operator has initiated either the raising or the lowering action. As such, this greatly reduces operator fatigue and it does not require operator skill and attention throughout the entire process of raising, retaining, and subsequently lowering the mowers to the ground.

DETAILED DESCRIPTION OF THE PREFERRED EMBODIMENTS AND METHOD

Figure 1:
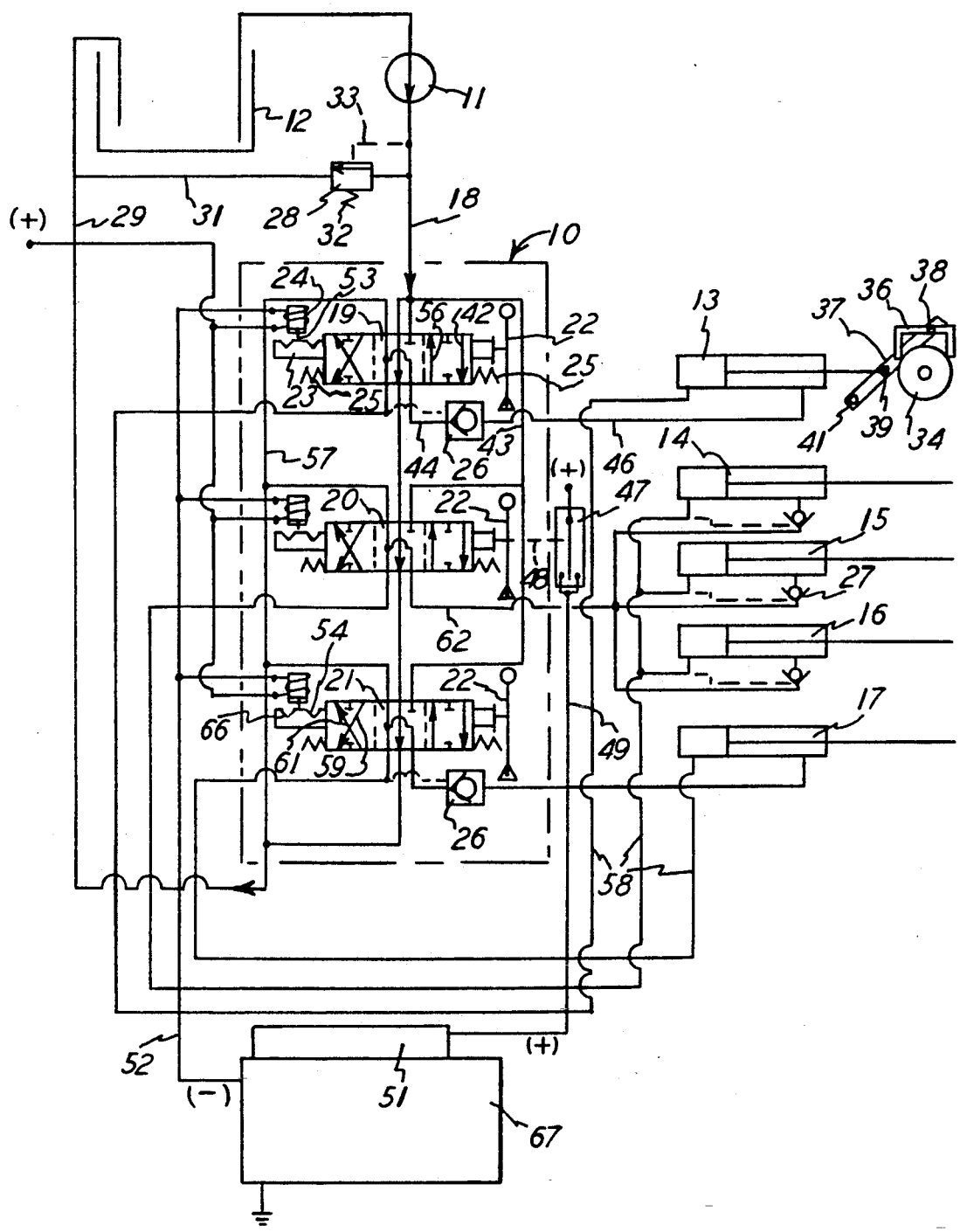
FIG. 1 is a diagrammatic view of one embodiment of the control system of this invention.

All of the drawings show a hydraulic system which includes the valve bank 10, the hydraulic pump 11, the reservoir 12, the interconnecting hydraulic hoses, which will be described separately later, and the five shown cylinder assemblies 13, 14, 15, 16, and 17.

In the hydraulic system shown, the pump 11 is hydraulically connected to the valve bank 10 through the hydraulic hose 18 and to each of the shown three hydraulic spools 19, 20, and 21, all of which are shown to be identical. Each of the shown three spools have a manually controlled lever 22 connected therewith, and each of the three spools also have a control detent portion 23 and an electric mating solenoid 24 which controls the position of the respective spools as hereinafter described. Also, each spool has a return spring 25 shown on each end of the respective spool for centering the spool, as described later.

Further, conventional hydraulic check valves 26 are hydraulically connected with the two spools 19 and 21, as shown, and also conventional check valves 27 are connected with the three center cylinder assemblies 14, 15, and 16, as shown.

It will therefore be seen and understood that the valve bank 10 is shown in dot-dash lines and incorporates a plurality of valve spools, and also there is a plurality of cylinder assemblies connected with the spools, such as in the arrangement of the center spool 20 being connected with, and thus controlling, the three center hydraulic assemblies 14, 15, and 16, while the spools 19 and 21, respectively, control the wing cylinder assemblies 13 and 17, all as again mentioned later.

A conventional hydraulic check valve 28 is connected between the hydraulic pressure line 18 and the hydraulic return line 29, and the connection is by means of the hydraulic line 31. It will be understood that a relief valve 28 will preclude hydraulic flow directly between the lines 18 and 29 unless and until hydraulic pressure in the line 18 is sufficient to cause the valve 28 to open against the closing spring 32 and thus permit the flow to go through the line 31 and directly into the return line 29, and the dotted line 33 indicates the arrangement for opening the relief valve 28 in response to excessive fluid pressure in the line, all in conventional diagramming and arrangement of the conventional relief valve 28.

The function of this hydraulic system is to raise and lower lawn mowers with each of the cylinder assemblies, such as the five shown, if that be a five-gang and tractor-supported type of machine. Thus, a lawn mower 34 is diagrammatically shown and it is indicated that it has a frame 36 and a pivotal lift and elevational support arm 37 which is pivotally connected to the frame 36 at 38 and which is pivotally connected to the cylinder assembly 13 at 39 and which can be pivotally mounted on the tractor frame (unshown) at 41, That is, it will be understood that this is a tractor-supported machine with a plurality or gang of mowers, and it may have five or other numbers of mowers, and the general arrangements can be as shown in any of the patents cited herein and as will be readily understood by anyone skilled in the mower machine art. With this invention, the mowers, such as the mower 34, can be raised to an intermediate and predetermined elevation, that is, between ground support level and a transport level, and that predetermined elevation is such that the operator can then maneuver the tractor without the mowers being on the ground and without having them fully raised to the transport position, such as mentioned at the outset hereof. In the arrangement shown, it will also be seen and understood that the unshown mowers which would be pivotally attached with the center cylinder assemblies 14, 15, and 16 would be raised as one unit, and the wing mowers which would be attached to the wing assembly 13 and 17 would be raised either with the center mowers or independent of the center mowers, whichever the operator desires by maneuvering of levers 22. Of course the levers are shown to be hand levers and are pivoted on the unshown tractor, all in a conventional and readily understood manner, but there could also be foot pedal control instead of the levers 22, but both controls would be a manual control.

With regard to the operation of a system, assuming that the operator desires to raise all five mowers 34 at one time, he would manually actuate all the three levers 22 leftwardly to correspondingly displace the spools 19, 20, and 21 leftwardly to where the three spool passageways 42 would fluid-flow communicate with the inlet line 18, and this communication is also achieved by the line 43 leading to the spools 20 and 21, as shown. Fluid would flow from the spools to the outlet lines 44 and through the check valves 26 and into the lines 46 and also into the line 62, all as connected with the five cylinder assemblies, to contract the assemblies for raising the respective mowers 34. That is, the operator will maneuver the levers 22 only to a distance and for a very short interval of time until the spool passageway 42 aligns with the inlet 18 and the outlet 44, as described. Beyond that, the system is automatic in positioning the mowers to the predetermined level and to retain them at that level until the operator reverses the function, as described later.

By virtue of the check valves 26, the wing mowers 34 are held in that predetermined elevation, and by virtue of the check valves 27, the center mowers are held at that predetermined elevation.

To achieve that predetermined elevation after the operator has touched the levers 22 with the slight displacement described herein, there is an electric switch 47 connected with the center spool lever 22 by means indicated by dotted line 48. The switch 47 has an electric line 49 connected with an electric timer 51, of FIG. 1, and that timer in turn is connected to a grounding box 67 and, through electric line 52, with each of the three solenoids 24. Therefore, upon closing of switch 47 the circuit is electrically grounded through box 67 and the solenoids 24 are energized to where their pintels 53 extend and go into the detent notch 54 to hold the spools in the heretofore described leftward shifting. The timer 51 holds the circuit closed for a few seconds. In that interval of holding, hydraulic fluid is being applied to the five cylinder assemblies so that the mower raising continues but without the operator's need for holding the lever 22. By virtue of the electric timer 51, the solenoids 24 are controlled so that after a specified time, say about one-and-one-half seconds, the circuit is opened and the solenoids retract their pintels 53 and release the detent arms 23 so that the spool springs 25 can re-center the spools to the positions shown in the drawings. That centered spool position holds the hydraulic pressure in all of the five assemblies, along with the holding by the five check valves mentioned, to retain the cylinder assemblies retracted for supporting the mowers in that predetermined raised position.

Of course in that leftwardly shifted spool position, the spool passageway 56 aligns with a hydraulic return line 57 which connects with each of the three valve sections or spools and the hydraulic fluid flows back to the reservoir 12. That is, a hydraulic line 58 connects with each end of the respective five cylinders and also connects with the spool return passageway 56 for the return flow just described.

As described, the operator simply pivots all three levers 22 for a very short time but sufficient to fully shift the spools, as mentioned, and that also actuates the electric switch 47, as mentioned. The spool is then held in the shifted position for about one-and-a-half seconds, in the system described herein, and that is a sufficient amount of time for the five mowers 34 to be raised about 8 inches so that they clear the ground, as described at the outset hereof. The mowers 34 remain raised in that intermediate and predetermined level until it is desired to lower them to the ground, or they could even be raised further to the transport position simply by having the operator over-ride the system by holding the levers 22 in the described shifted position.

When it is desired to lower the mowers to the ground, the operator will shift the levers 22 rightwardly, as viewed in the drawings, and that will shift the spools 19, 20, 21 rightly to where the spool ports 59 align with the inlet line 18 and direct the hydraulic flow in reverse direction, that is to the head ends of the five cylinder assemblies, for lowering the mowers 34. In that lowering, the spools have return passageways 61 which permit flow from the hoses or lines 44 and through the spool and to the return line 57. In that rightwardly shifted spool position, the pressure line becomes line 58 which is connected with the port passageway 59, and that also pressurizes each of the five check valves 26 and 27 to open the check valves, such as through the dotted lines shown connected with each check valve via the dotted lines and in the conventional arrangement such that the hydraulic hose connections at the rod end of the cylinder assemblies become the return lines for that mower lowering action. Again, all the operator need do is to shift the spools rightwardly, and that will again activate the switch 47 and operate the timer 51 so that the operator need not attend to the fully manual function of lowering the mowers, but the system automatically does that by having the timer retain the spools in the shifted position for an amount of time sufficient to cause the mower to lower to the ground. After the timer 51 is exhausted and thereby de-activated, the solenoids are again retracted and the spools returned to neutral or centered positions. In that operation, it will also be seen that the line 44 becomes the return line and it is directly connected with the return line 57 through each spool, including the return line 62.

The system is arranged so that the mowers 34 in the ground-supported position can float up and down in accordance with ground undulations. Also, the mowers are held in set predetermined or maneuvering or turning operations, as described herein, when in that predetermined elevated position.

Also, the mowers can be placed into the transport positions, such as by having the operator manually maneuver any or all of the levers 22 for continuing the energizing of the respective cylinder assemblies for raising to the transport position, and that will be readily apparent in the drawings.

Thus, the system of FIG. 1, is a time-sensing system with a conventional electric timer 51, and the electric switch 47 is the mower-lifting sensor means, and the timer 51 and the solenoids are the valve control means operatively connected with the sensor means, all for the automatic lifting and lowering of the mowers 34, and to the elevation of the predetermined height of the suggested 8 inches which is intermediate the ground level and the higher transport positions for the mowers 34. It is not required that the operator retain his attention and manual operation of maneuvering the levers 22 for either the raising or lowering of the mowers to the predetermiend, and intermediate elevations mentioned, and, alternatively, the operator can over-ride the automatic system simply by retaining the displacement of the spools until the desired action of raising the mowers to the transport position, or lowering the mowers to the ground position is achieved.

Figure 2:
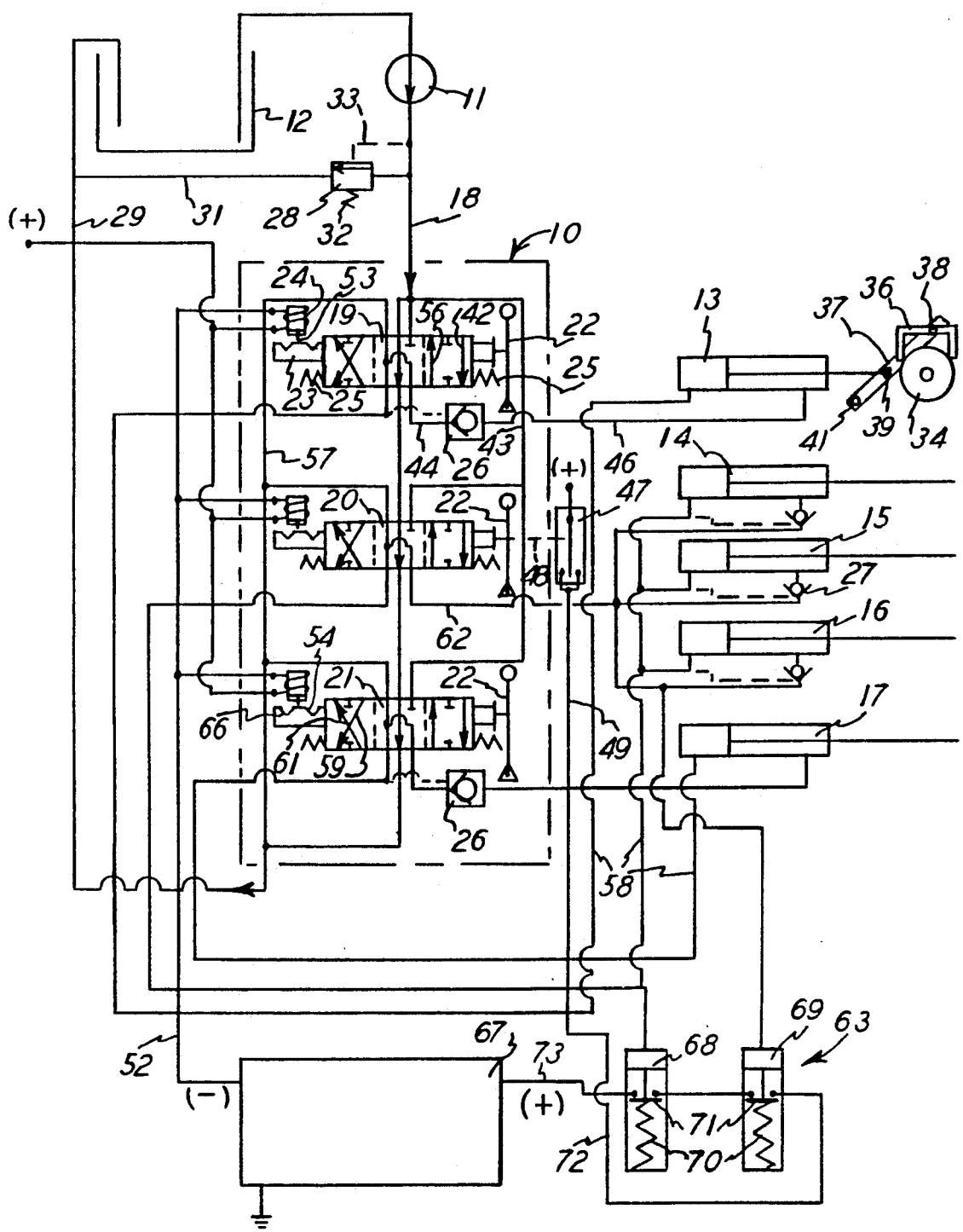
FIGS. 2 and 3 are diagrammatic views, similar to FIG. 1, but showing two other embodiments of this invention.
Figure 3:
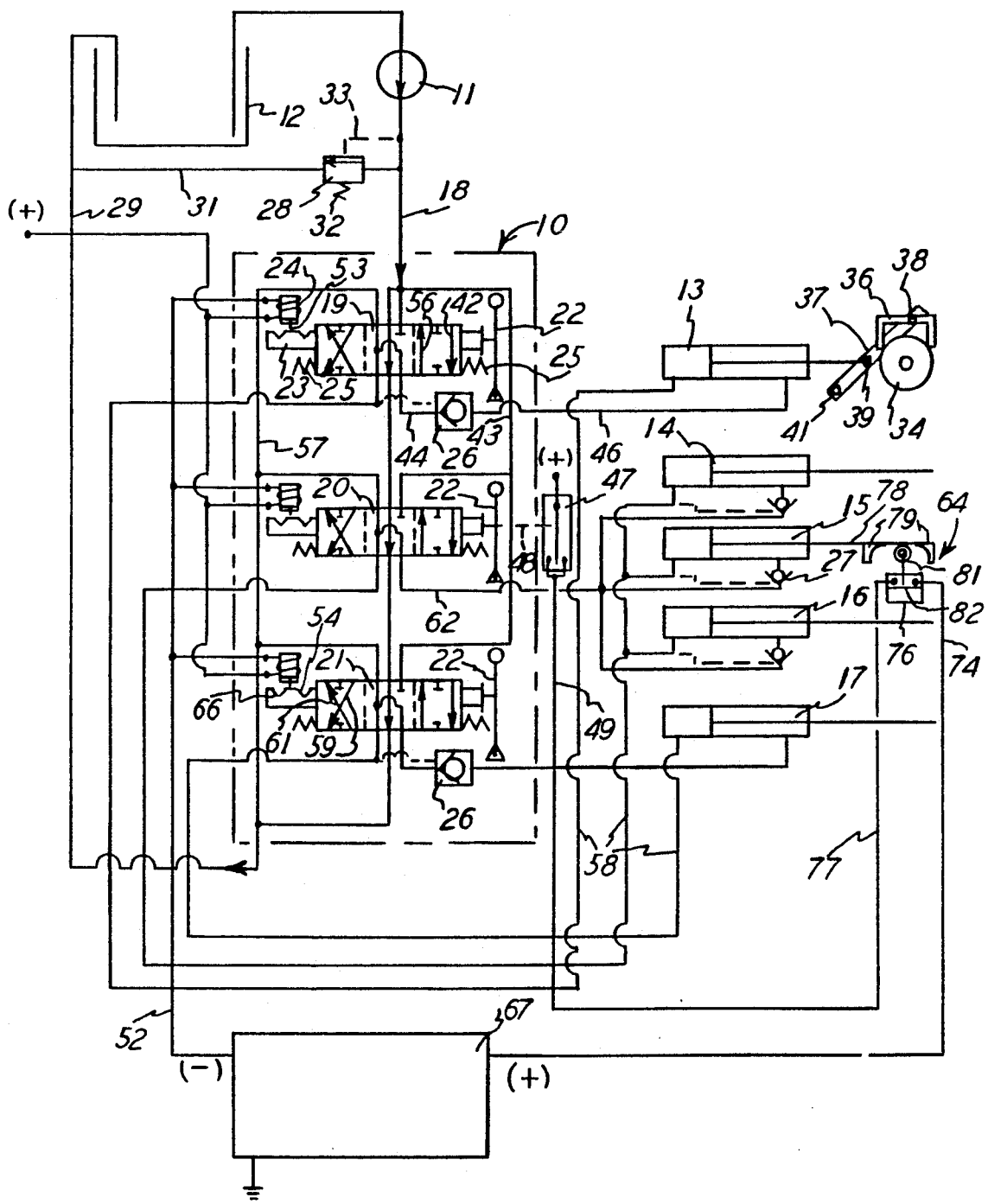

Therefore, in FIG. 1, the timer 51 electrically grounds the solenoids 24 when the plus terminal of switch 47 is connected to the timer 51. FIG. 2 shows the system where the solenoids 24 are electrically grounded until the hydraulic pressure in the system triggers the sensor means designated 63; and FIG. 3 shows the system where solenoids are electrically grounded until the system senses the elevation of the mowers, by the sensor means designated 64.

Also, in the three embodiments, the three pintels 53 will enter the three respective detents 66 for holding the respective spools in the shifted position for the control and automatic lowering of the mowers.

In all three embodiments, there is the electric switch sensor 47 which is of a double-throw type, as shown, and there is an electric connection box 67 electrically connected with the switch in the various arrangements shown, and thus there is grounding of the electrical system through the box 67 in all three embodiments. In the embodiment of FIG. 1, the grounded or electrically connected condition exists only for the length of the action of the timer 51, and at the end of that time, say the one-and-a-half seconds in accordance with the power and capacity of the hydraulic system, the mowers will have either been raised to the predetermined level of, say 8 inches, or they will have been lowered to the ground, depending upon operator's actuation of the lever 22 for the center mowers and thus actuation of the switch 47.

In the FIG. 2 embodiment, the sensor means 63 is shown to be a pair of spring-biased electric switches 68 and 69, with the switch 68 hydraulically actuated and connected with the head ends of the center cylinder assemblies 14, 15, and 16, as shown. Likewise, the hydraulically actuated electric switch 69 is connected to the rod ends of those three center cylinder assemblies, as shown. Accordingly, the switches 68 and 69 will sense the hydraulic pressure in the three center cylinder assemblies, and the switches 68 and 69 have their respective contacts 71 move into and out of electric contact with the connecting lines 72 and 73 which respectively connect with the switch 47 and the grounding box 67, as shown. In that arrangement of FIG. 2, the electric switch 47 and the electric switches 68 and 69, which are under the influence of the hydraulic pressure in the system, are the sensing means in the FIG. 2 embodiment and the entire system responds to the hydraulic pressure in the system, as described. Of course the contact 71 in the switch 68 will be in the electrically open position when the mowers are fully lowered because the hydraulic pressure will be exerted on the head end of the switch 68, and when the rod ends of the cylinder assemblies have received the predetermined hydraulic pressure for fully raising the mowers, then the switch 69 will be in the open position and thus break the electric circuit in the box 67 to cause the hydraulic valve spools to return to neutral, having achieved the desired predetermined mower elevation.

In the FIG. 3 embodiment, again, there is the electric grounding box 67 which is electrically connected through wires 74 to one side of an electric switch 76 of the sensor 64, and there is an electric line 77 which connects with the sensor switch 47, as shown. Also, the center cylinder assembly 15 has its rod 78 provided with two cams 79 which move with the rod extension and contraction, and the cams engage a cam follower or roller 81 which is part of the switch 76. Thus, upon movement of either cam 79 into engagement with the roller 81, the switch contact 82 will open and thus de-energize or break the electric circuit through the box 67 and thus cause the spools to move back to neutral from either the raising or the lowering position for the mowers.

In these regards, the sensing means of FIG. 1 is the electric switch 47, and the sensing means of FIGS. 2 and 3 is the electric switch 47 plus the sensors 63 and 64. In all three embodiments, the electric control means includes the solenoids 24 and the detent arm 23. In all embodiments, the operator needs to only instantaneously and fully shift the center spool 20 by means of the lever 22, for either raising or lowering the mowers, and, beyond that shifting, the system of hydraulics and electrical controls render the operation automatic to the desired predetermined elevated positions and to the desired lowered position of having the mowers on the ground.

Switches 68 and 69 are held in the electrically closed position by means of compression springs 70, as shown, and switch 76 would be similarly spring-biased closed.

I claim:

1. A tractor type lawn mowing machine which has a mower and a hydraulic system for lifting said mower and with said mower-lifting system including a hydraulic valve and a hydraulic cylinder assembly and hydraulic hoses connected between said valve and said assembly, and said cylinder assembly being extendable between a ground-supported mower position and an elevated lifted mower transport position, a manual control connected to said hydraulic valve for actuating said valve and thereby positioning said mower between said ground-supported position and said transport position, mower-lifting sensor means operatively connected with said manual control for sensing when said system is actuated for lifting said mower, said sensor means having an operative sensing position arranged to operate in coordination with movement of said manual control at a position intermediate said ground-supported mower position and said elevated lifted mower position, automatically operative valve control means operatively connected with said sensor means for operating in response to said sensor means being in said operative sensing position for controlling a mower-lifting operating position of said valve to have said valve direct hydraulic fluid to said cylinder assembly for lifting said mower to said intermediate position.

2. The tractor type lawn mowing machine as claimed in claim 1, wherein said valve control means is arranged to control said valve in accord with lifting said mower only to an elevation lower than said elevated transport position.

3. The tractor type lawn mowing machine as claimed in claim 2, wherein said manual control is operatively connected with said valve for over-riding said valve control means and thereby operate said valve to effect lifting of said mower to said elevated transport position.

4. The tractor type lawn mowing machine as claimed in claim 2, wherein said manual control is operatively connected with said valve and having an operating position for over-riding said valve control means and thereby operate said valve to effect lifting of said mower to said elevated transport position and having another operating position for over-riding said valve control means and thereby operate said valve to effect lowering of said mower from any mower-lifted position.

5. The tractor type lawn mowing machine as claimed in claim 1, wherein said sensor means includes an electric switch.

6. The tractor type lawn mowing machine as claimed in claim 1, wherein said sensor means includes a hydraulic pressure sensor.

7. The tractor type lawn mowing machine as claimed in claim 1, wherein said sensor means includes a mower elevation sensor.

8. The tractor type lawn mowing machine as claimed in claim 1, wherein said valve includes a three-section shiftable spool connected with said manual control and having a mower lifting position and a mower lowering position and a neutral hydraulic pressure maintaining position, said sensor means operatively connected with said manual control to be operated by said manual control, and said valve control means being operatively connected with said spool for releasably holding said spool in both said lifting and lowering positions.

9. The tractor type lawn mowing machine as claimed in claim 8, including a spring operative on said spool for positioning said spool in said neutral position when said valve control means is released from the lifting position of said spool to maintain hydraulic pressure in said system.

10. The tractor type lawn mowing machine as claimed in claim 8, wherein said valve control means includes a timer operative in response to the shifting of said spool by said manual control and arranged for controlling said valve control means for holding said spool in said mower-lifting position only for a length of time effective for the lifting of said mower to an elevation only lower than said transport position.

11. The tractor type lawn mowing machine as claimed in claim 10, including a spring operative on said spool for positioning said spool in said neutral position when said valve control means is released from said spool to maintain the hydraulic pressure in said system.

12. In a tractor type lawn mowing machine which has a gang of mowers and a hydraulic system for lifting said mowers and with said mower-lifting system including pluralities of hydraulic valves and hydraulic cylinder assemblies and hydraulic hoses connected between said valves and said assemblies, and a plurality of manual controls for said valves, and said cylinder assemblies being extendable between a ground-supported mower position and an elevated lifted mower transport position, the improvement comprising mower-lifting sensor means operatively connected with only one of said manual controls for sensing when said system is actuated for lifting said mowers, a plurality of valve control means operatively connected with said sensor means and respectively with each of said valves for operating in response to said sensing of said sensor means and being arranged for controlling a mower-lifting operating position of said valves to have all said valves direct hydraulic fluid to all respective said cylinder assemblies for lifting all said mowers.

13. In a tractor type lawn mowing machine which has a plurality of mowers and a hydraulic system for controlling the elevational support of said mowers and with said mower-lifting system including a plurality of hydraulic valves and hydraulic cylinder assemblies and hydraulic hoses respectively connecting said valves and said assemblies, and said cylinder assemblies being extendable between a ground-supported mower position and an elevated lifted mower transport position, the improvement comprising mower-elevation sensor means operatively connected with said hydraulic system for sensing when said system is actuated for elevational support of said mowers, valve control means operatively connected with said sensor means and respectively with all of said valves for operating in response to said sensing of said sensor means for controlling mower-elevation operating position of said valves to have said valves direct hydraulic fluid to said cylinder assemblies for controlling elevation of said mowers.

14. The tractor type lawn mowing machine as claimed in claim 13, wherein said sensor means is operatively connected with said system to sense the hydraulic output of only some rather than all of said valves in said system for sensing when only less than all of said plurality of mowers are elevationally supported, and with said valves other than said some valves being arranged to be operable without influencing said sensor means, for elevational support of only those of said mowers which are operatively connected with said valves other than said some valves.

15. The tractor type lawn mowing machine as claimed in claim 14, wherein those of said mowers, which are operatively connected with said valves other than said some valves, are disposed at both lateral sides of the location of said less than all of said mowers.

16. A method for controlling the elevation of a lawn mower supported on a tractor having a hydraulic system including a lift valve and a cylinder assembly for elevational support of said mower, the steps comprising manually actuating said valve to an operational position of cylinder assembly elevational support of said mower, sensing the elevating effort exerted by said system, imposing said sensing on said system to place said system in a condition to have said system elevate said mower to a predetermined elevation, retaining said system in said condition to maintain said mower in said predetermined elevation for a limited time, and manually actuating said valve to an operational position of lowering said mower from said predetermined elevation, sensing the lowering effort exerted by said system, and providing a controlled release of hydraulic pressure in said system after the commencement of said sensing of the lowering effort.

17. A method for controlling the elevation of a lawn mower supported on a tractor having a hydraulic system including a lift valve and a cylinder assembly for elevational support of said mower, the steps comprising manually actuating said valve to an operational position of cylinder assembly elevational support of said mower, sensing the elevating effort exerted by said system, imposing said sensing on said system to place said system in a condition to have said system elevate said mower to a predetermined elevation, retaining said system in said condition to maintain said mower in said predetermined elevation for a limited time, and providing a plurality of said valves and of said mowers in a gang and wherein some of said valves can operate independent of said sensing, manually actuating said some of said valves for the elevational support of said mowers to a transport elevation which is an elevation higher than said predetermined elevation.

18. In a tractor type lawn mowing machine which has a mower and a hydraulic system for lifting said mower and with said mower-lifting system including a hydraulic valve and a hydraulic cylinder assembly and hydraulic hoses connected between said valve and said assembly, said cylinder assembly being extendable between a ground-supported mower position and an elevated lifted mower transport position, the improvement comprising mower-lifting sensor means operatively connected with said hydraulic system for sensing when said system is actuated for lifting said mower, valve control means operatively connected with said sensor means for operating in response to said sensing of said sensor means for controlling a mower-lifting operating position of said valve to have said valve direct hydraulic fluid to said cylinder assembly for lifting said mower, said valve control means is arranged to control said valve in accord with lifting said mower only to an elevation lower than said elevated transport position, and a control operatively connected with said valve for over-riding said valve control means and thereby operate said valve to effect lifting of said mower to said elevated transport position.

19. The tractor type lawn mowing machine as claimed in claim 18, wherein said sensor means includes an electric switch.

20. The tractor type lawn mowing maching as claimed in claim 18, wherein said sensor means includes a hydraulic pressure sensor.

21. The tractor type lawn mowing maching as claimed in claim 18, wherein said sensor means includes a mower elevation sensor.

22. In a tractor type lawn mowing machine which has a mower and a hydraulic system for lifting said mower and with said mower-lifting system including a hydraulic valve and a hydraulic cylinder assembly and hydraulic hoses connected between said valve and said assembly, and said cylinder assembly being extendable between a ground-supported mower position and an elevated lifted mower transport position, the improvement comprising mower-lifting sensor means operatively connected with said hydraulic system for sensing when said system is actuated for lifting said mower, valve control means operatively connected with said sensor means for operating in response to said sensing of said sensor means for controlling a mower-lifting operating position of said valve to have said valve direct hydraulic fluid to said cylinder assembly for lifting said mower, said valve control means is arranged to control said valve in accord with lifting said mower only to an elevation lower than said elevated transport position, and a manual control operatively connected with said valve and having an operating position for over-riding said valve control means and thereby operate said valve to effect lifting of said mower to said elevated transport position and having another operating position for over-riding said valve control means and thereby operate said valve to effect lowering of said mower from any mower-lifted position.

* * * * *